Aug. 24, 1926.

S. J. V. BOVEY 1,597,048

HEATER FOR VEHICLES

Filed Jan. 8, 1926

Inventor:
Sidney J. V. Bovey.
By Sprinkle & Smith
Attys.

Patented Aug. 24, 1926.

1,597,048

UNITED STATES PATENT OFFICE.

SIDNEY J. V. BOVEY, OF CHICAGO, ILLINOIS.

HEATER FOR VEHICLES.

Application filed January 8, 1926. Serial No. 79,927.

This invention relates to a heater for vehicles.

One of the objects of the present invention is to provide an improved heating device for vehicles or automobiles particularly of the enclosed type.

A further object of the invention is to provide an improved heating device whereby the air within the enclosed body of the vehicle is continuously circulated from within the body of the vehicle through a conduit to the heating element and thence back into the body.

A still further object of the invention is to provide a heating device having an operative means connected with a moving element of the engine of the vehicle for causing a complete circulation of the air from within the body of the vehicle to the heater and thence back into the body of the vehicle.

A still further object of the invention is to provide an improvement in the arrangement of a heating device whereby the heated air is caused to be discharged into the rear portion of the enclosed body of the automobile and the cool air withdrawn from the front portion of the automobile body.

These and other objects are accomplished by providing a construction and an arrangement of the parts in the manner hereinafter described and particularly pointed out in the appended claims.

Referring to the drawings:

Fig. 1 is a fragmentary view of the internal combustion engine and body of an enclosed automobile or vehicle showing my improved heating device mounted therein.

Fig. 2 is a side elevational view of an enclosed automobile shown in dotted lines illustrating the relative position of the parts of my heating device with respect to the various parts of the automobile, and Fig. 3 is a cross sectional view taken on the line 3—3 in Fig. 1, showing the shape of the conduit for conveying the heated air to the rear portion of the body of the automobile with the valve in its closed position.

In the design of my present invention I have overcome considerable objection which is met by the form of vehicle heater now in use that has a conduit leading from adjacent the radiator fan and extending rearwardly over a portion of the exhaust manifold or exhaust pipe into the body of the car for conveying the heated air into the car. The principal objection to this form of heater is that a considerable amount of dirt and dust and also anti-freezing solution fumes which are drawn in by the radiator fan are conveyed directly into the body of the car. With my present invention I have not only overcome this difficulty but also provide a more efficient heater in that the cool air is withdrawn from the interior of the car through my heating system and again heated and passed into the car body.

For the purpose of illustration I have shown my improved heating device in connection with the conventional form of enclosed type of automobile as shown at 10, which is provided with the convention form of internal combustion engine 11. The engine 11 is provided with the usual radiator fan 12 which is operatively driven by the usual endless belt 13 which is trained about pulleys 14 and 15 secured to the fan shaft and crank shaft respectively. The engine 11 is provided with the usual exhaust conduit for conveying the exhaust gases from the engine which includes the exhaust manifold 16 and exhaust pipe 17. The exhaust pipe 17 is connected to the exhaust manifold 16 by flanges 18 formed on the adjacent ends of both these members and bolts 19. The lower end of the manifold is bent as shown at 20 and extends rearwardly in a horizontal plane parallel to the floor of the car. The rear end of the exhaust pipe 17 is provided with the usual muffler 21. It will of course be understood that the shape of the exhaust pipe is different in many types of cars and I have made special provision in the construction of my improved heating device for accommodating the various types of these exhaust pipes so that my heating attachment may be readily installed in any make of automobile or vehicle. The manner in which this is accomplished will hereinafter be more fully described.

In Fig. 1 of the drawing I have shown only a fragmentary portion of the enclosed body of the automobile which comprises the usual vertical dash board 22, only a portion of which is shown, and inclined floor board 23. Extending rearwardly from the inclined floor board 23 is the usual main floor or bottom of the car body 24. In Fig. 1 I have shown a fragmentary portion of the front seat 25 and the rear seat 26.

One of the essential features of my improved heating device is the provision of means whereby the air in the enclosed body is kept in constant circulation and in which the heated air is discharged in the rear part of the car and the cool air withdrawn from the front part of the car. The cool air is drawn through the conduit 32 and immediately comes in contact with the inclined portion of the exhaust pipe, where it becomes heated and thence is conveyed from the heating chamber into the rear portion of the body of the car. This circulation of air is accomplished by providing a suitable aperture 27 in the vertical dash board 22 over which is placed a screen or perforated plate 28. Mounted on the forward side of the aperture 27 in the dash 22 is a housing 29 substantially in the form of an elbow having one end 30 surrounding the aperture 27 and the other end 31 forming a connection with a conduit 32. Journalled in a bearing portion 33 formed in the housing 29 is a shaft 34. The shaft 34 has on its rearward end a fan 35. The fan 35 is rotatably driven by a flexible shaft of any well known construction mounted within the casing 36. The forward end of the casing 36 together with the flexible shaft therein is secured in position by a bracket 37 which in turn is secured to a suitable portion of the engine block or frame. The forward end of the flexible shaft within the casing 36 has secured thereto a stub shaft 38 which is journalled in the bracket 37. The stub shaft 38 has secured to its forward end a pulley 39 which engages the fan belt 13 of the engine.

While I have described the fan for causing the air to circulate within the enclosed body of the car as being driven from the regular fan belt of the engine, it will, of course, be understood that other moving elements of the engine such as the crank or main shaft may be employed and I do not necessarily wish to be restricted to the driving connections shown in the drawing. Secured to the connecting conduit 32 and embracing the upper and forward end of the pipe 17 and having one end in close contact therewith is an end casing member 40 which may be made in half portions with suitable flanges for clamping the half portions together or may be made in the form shown in the drawing as one integral member and slid over the exhaust pipe when my heating device is being installed on the car. The end casing member 40 has its lower end, as shown at 41, surrounding and spaced from the inclined portion of the exhaust pipe 17 and is adapted to receive in telescopic relation a heating casing or tube 42. In actual practice I find that in some cases where the exhaust pipe is provided with many crooks or bends a flexible tubing facilitates the installation of the heating attachment, while in other cases, I prefer to use a rigid casing such as shown in the drawing, but, it will of course be understood that I do not wish to be unnecessarily restricted to either form, as the same results may be accomplished by either. This casing is in spaced relation with the exhaust pipe 17 so as to form a space or heat chamber 43 around the exhaust pipe. The rear end of the casing 42 extends along the horizontal portion of the exhaust pipe and has its rear end connected to a casing end member 44 which it receives in telescopic relation in one end thereof and the other end of the member 44 is secured to and in contacting relation with the exhaust pipe 17, as shown at 45. The upper and rear portion of the end casing member 44 is provided with an opened end 46 which telescopically receives the conduit 47 which has its rear end sloping upwardly and outwardly as shown at 48 and connected with the register 49 secured to the floor board or flooring 24 in the rear portion of the body of the car. The heater is provided with the usual valve and control lever 50 for closing and opening the valve.

From the above description it will of course be understood that by reason of the fan 35 being mounted in the opening in the dashboard 22 of the car body, and operably driven through the flexible shaft and pulley 39 by the regular fan belt 13 of the engine, the cool air is drawn through the screen or register 28 and is forced downwardly through the conduit 32 into the heating chamber formed by the casing 42 surrounding a portion of the exhaust gas pipe 17. From this casing the heated air passes through the conduit 47, up through the register 49 in the rear of the body of the car, from where it is circulated up through the top of the car, thence forwardly and back through the same connection as above described. This construction not only assures a complete and continuous circulation of the air within the car, but also provides an efficient and rapid heater and one from which the dust and dirt is entirely eliminated.

While in the above specification I have described one embodiment which my invention may assume in practice, it will of course be understood that the same is capable of modification, and that modification may be made without departing from the spirit and scope of the invention as expressed in the following claims.

What I claim as my invention and desire to secure by Letters Patent is:

1. In combination with a motor vehicle, an internal combustion engine mounted on said vehicle, a radiator fan rotatably mounted on the forward end of said engine, a fan belt operably connecting said fan with said crank shaft, a vertical dash board and horizontal floor board forming a part of said vehicle, an exhaust gas pipe having a portion inclined rearwardly and downwardly, and another portion thereof extending horizontally, a casing embracing both portions of said exhaust gas pipe, a cool-air conduit having one end extending through the dash board of said vehicle and the other end communicating with one end of said casing, a hot-air conduit leading from said casing through the floor board of said vehicle, and a rotary fan mounted in said cool-air conduit adjacent said dash board and operably connected to the fan belt of said engine for continously circulating the air from within said vehicle to said casing and thence back to said vehicle.

2. In combination with a motor vehicle, an internal combustion engine mounted on said vehicle, a radiator fan rotatably mounted on the forward end of said engine, a crank shaft for said engine, a fan belt operably connecting said fan with said crank shaft, a vertical dash board, an inclined foot board and a horizontal floor board forming a portion of said vehicle, an exhaust gas pipe having a portion lying in close proximity to said inclined foot board and another portion in close proximity to said horizontal floor board, a casing embracing both portions of said exhaust gas pipe, a relatively short cool-air conduit having one end extending through the dash board of the vehicle and the other end thereof communicating with the upper end of said casing, a hot-air conduit reaching from said casing through the floor board of said vehicle, and a rotary fan mounted in said cool-air conduit adjacent said dash board and operably connected to said fan belt for causing the air to circulate through said casing.

3. In combination with a motor vehicle, an internal combustion engine mounted on said vehicle, a radiator fan rotatably mounted on the forward end of said engine, a crank shaft for said engine, a fan belt operably connecting said fan with said crank shaft, a vertical dash board, an inclined foot board, and a horizontal floor board, forming a portion of said vehicle, an exhaust gas pipe having a portion lying in close proximity to said inclined foot board and another portion in close proximity to said horizontal floor board, a casing embracing both portions of said exhaust gas pipe, a cool-air conduit having one end extending through the dash board of the vehicle and the other end thereof communicating with the upper end of said casing, a hot-air conduit reaching from said casing through the floor board of said vehicle, and a rotary fan mounted in one of said conduits and operatively connected to said fan belt for causing the air to circulate through said casing.

In testimony whereof I have signed my name to this specification, on this 31st day of December A. D. 1925.

SIDNEY J. V. BOVEY.